US008701112B2

(12) United States Patent
Borghetti et al.

(10) Patent No.: US 8,701,112 B2
(45) Date of Patent: Apr. 15, 2014

(54) WORKLOAD SCHEDULING

(75) Inventors: Stefano Borghetti, Rome (IT);
Gianluca Della Corte, Naples (IT);
Leonida Gianfagna, Rome (IT);
Antonio Marlo Sgro', Girifalco (IT)

(73) Assignee: International Business Machines Corporation, Armonk, NY (US)

( * ) Notice: Subject to any disclaimer, the term of this patent is extended or adjusted under 35 U.S.C. 154(b) by 1003 days.

(21) Appl. No.: 12/423,389

(22) Filed: Apr. 14, 2009

(65) Prior Publication Data
US 2009/0260012 A1 Oct. 15, 2009

(30) Foreign Application Priority Data

Apr. 15, 2008 (EP) .................................. 08154507

(51) Int. Cl.
*G06F 9/46* (2006.01)
(52) U.S. Cl.
USPC ......................................................... 718/102
(58) Field of Classification Search
None
See application file for complete search history.

(56) References Cited

U.S. PATENT DOCUMENTS

| 5,668,995 | A | * | 9/1997 | Bhat ............................. 718/104 |
| 6,463,532 | B1 | | 10/2002 | Reuter et al. |
| 6,477,572 | B1 | * | 11/2002 | Elderton et al. ............... 709/224 |
| 6,651,242 | B1 | | 11/2003 | Hebbagodi et al. |
| 7,275,014 | B1 | | 9/2007 | Koren et al. |
| 7,293,073 | B2 | | 11/2007 | Jacobs et al. |
| 8,040,798 | B2 | | 10/2011 | Chandra et al. |
| 8,185,481 | B2 | | 5/2012 | Long et al. |
| 2004/0103194 | A1 | | 5/2004 | Islam et al. |
| 2006/0080422 | A1 | | 4/2006 | Huberman et al. |
| 2007/0233626 | A1 | | 10/2007 | Rupp et al. |
| 2009/0097772 | A1 | | 4/2009 | Zhao et al. |
| 2009/0260012 | A1 | | 10/2009 | Borghetti et al. |

FOREIGN PATENT DOCUMENTS

JP H07129529 5/1995

OTHER PUBLICATIONS

Appleby et al., "Using Automatically Derived Load Thresholds to Manage Compute Resources On-Demand", 2005.*
Written Opinion, International Searching Authority.
Appleby. Karen: Goldszmidt. German: "Using Automatically Derived Load Thresholds to Manage Compute Resources On-Demand:" Integrated Network Management; 9th IFIP IEEE International Symposium: May 15-19, 2005; Nice, France: 13 pages (pp. 747-760). Piscataway. NJ: USA.
Reza: Olfati-Saber: Fax. Alex J., Murray. Richard: "Consensus and Cooperation in Networked Multi-Agent Systems:" Proceedings of the IEEE Jan. 1, 2007; New York, USA; 18 pages (pp. 215-233).

(Continued)

*Primary Examiner* — Andrew Caldwell
*Assistant Examiner* — John Lindlof
(74) *Attorney, Agent, or Firm* — D'Ambrosio & Menon, PLLC; Usha Menon; Sudhir Menon

(57) ABSTRACT

Computer-implemented methods, computer program products and systems for a scalable workload scheduling system to accommodate increasing workloads within a heterogeneous distributed computing environment. In one embodiment, a modified average consensus method is used to evenly distribute network traffic and jobs among a plurality of computers. The user establishes a virtual network comprising a logical topology of the computers. State information from each computer is propagated to the rest of the computers by the modified average consensus method, thereby enabling the embodiment to dispense with the need for a master server, by allowing the individual computers to themselves select jobs which optimally match a desired usage of their own resources to the resources required by the jobs.

17 Claims, 3 Drawing Sheets

(56) References Cited

OTHER PUBLICATIONS

Kingston, Derek B: Beard. Randal W; "Discrete-Time Average-Consensus under Switching Network Topologies:" Proceedings of the American Control Conference: Jun. 14-16, 2006 Minneapolis, MN, USA; 6 pages (pp. 3551-3556).

Rabbat. Michael G: Nowak Robert D., Buckalew. James A. "Generalized Consensus Computation in Networked Systems with Erasure Links." 2005 IEEE 6th Workshop in Wireless Communications; Jun. 2-8, 2005, New York, New York. USA: 5 pages (pp. 1088-1092).

JPO Office Action dated Jun. 18, 2013 for co-pending related application No. 2011-504401.

USPTO Notice of Allowance dated Apr. 2, 2013 for related co pending U.S. Appl. No. 12/840,829.

Das et al., "K-Node Connected Power Efficient Topologies in Wireless Networks With Sectored Antennas" Military Communications Conference, 2005. Milcom 2005. IEEE Date of Conference: Oct. 17-20, 2005.

Kim et al., "On Maximizing the Second Smallest Eigenvalue of a State dependent Graph Laplacian" IEEE Transactions on Automatic Control Feb. 2006; DOI:10.1109/TAC.2005.861710 pp. 116-120.

Boyd, Stephen: Kim, Seung-Jean; Xiao, Lin; "Distributed Average Consensus with Least-Mean-Square-Deviation" Journal of Parallel and Distributed Computing; vol. 67; 2007; pp. 33-46; Department of Electrical Engineering, Stanford University. Stanford, CA, USA; Center for Mathematics of Information, California Institute of Technology, Pasadena. CA, USA.

Mostefaoui, A. Rajsbaum, S; Raynal, S; Roy, M; "Efficient Condition-Based Consensus" Proceedings of the 8th International Colloquium on Structural Information and Communication Complexity; 2001; pp. 275-291; SIROCCO'01; Carleton University Press; USA.

Akl, S; Alsalih, W; Hassancin. H; " Energy-Aware Task Scheduling: Towards Enabling Mobile Computing over MANETs" Parallel and Distributed Processing Symposium; Proceedings. 19th IEEE International; p. 242a; 2005; Apr. 4-8, 2005; Denver, CO: USA.

Fizzano, Perry; Karger, David; Wein, Joel; "Job Scheduling in Rings"; In Journal of Parallel and Distributed Computation; 34:2; 1997; SPAA '94.

Herilhy, Maurice; Rajsbaum, Sergio; "Set Consensus Using Arbitrary Objects"; In Proceedings of thirteenth annual ACM symposium on Principals of distributed computing; 1994.

Cunningham, H. Conrad; Vazhkudai, Sudharshan; "A Reusable Software Framework for Distributed Decision-Making Protocols"; Department of Computer and Information Science; University of Mississippi; University, MS 38677, USA.

\* cited by examiner

WORKLOAD SCHEDULING

PRIORITY

This application is based on and claims priority from European Patent Application No. 08154507.1 filed on Apr. 15, 2008.

BACKGROUND

Workload scheduling is an increasingly important component of an IT environment. Many grid computing environments are driven by the scheduling of work across a distributed set of resources (e.g. computation, storage, communication capacity, software licenses, special equipment etc.). Scheduling requires optimization, which may be fairly straightforward when only one resource type is involved. Traditional approaches to job scheduling employ a master/agent architecture, wherein jobs are set up, scheduled and administered from a central server (known as a "master" server). The actual work is done by agents installed on the other servers. In use, the master maintains and interprets information relating to the jobs, available servers etc., so as to decide where to assign jobs. The agents, in turn, await commands from the master, execute the commands, and return an exit code to the master.

SUMMARY

The master/agent architecture allows tight control over jobs, however the master and agents must remain synchronized and possesses limited scalability. In particular, a master can support only a limited number of agents and creating a new master or instance creates a new and separate administration, so that the more instances created, the more management is needed.

In one embodiment of the invention, a method of scheduling a workload comprises establishing a network comprising one or more computers; establishing a desired operating point for the network; determining, based on the execution of one or more jobs, the current usage of the resources of at least some of the computers in the network; calculating a predicted state value for each computer in the network from the current usage of the computers resources and the desired operating point; and executing another job by one of the computers in the network, wherein the job to executed is selected if the computer's predicted state value substantially exceeds the current usage of the computer's resources.

Determining the current usage of the resources of at least some of the computers in the network further comprises acquiring information related to the current usage of the resources from resource consumption data. The resource consumption data may be gathered by monitoring software.

Prior to establishing a network a user may be allowed to select a topology for the network. The computers may be linked in accordance with the selected topology. The network of computers is linked to form a connected graph.

Calculating the predicted state value for each computer in the network further comprises allowing a user to select a neighbourhood value; forming a neighbourhood group for each computer, the neighbourhood group comprising the neighbourhood value number of computers most proximal to the computer in the graph of the network; and calculating the predicted state value from the average of the desired operating point and the current usage of the resources of the computer and those of the computers in its neighbourhood group.

The resource requirements of the job selected for execution may be closest to the difference between the computer's predicted state value and the current usage of the computer's resources.

One or more embodiments of the method may be implemented as a computer-implemented method, system and computer program product for workload scheduling in a heterogeneous distributed computing system.

In another embodiment of the invention, a scalable system for workload scheduling is provided to accommodate increasing workloads within a heterogeneous distributed computing environment. This embodiment of the invention employs a modified average consensus method to evenly distribute network traffic and jobs amongst a plurality of computers. To this end, this embodiment allows a user to establish a virtual network comprising a logical topology of the computers. State information from each computer is propagated to the rest of the computers by the modified average consensus method, thereby enabling this embodiment to dispense with the need for a master server, by allowing the individual computers to themselves select jobs which optimally match a desired usage of their own resources to the resources required by the jobs.

The details of one or more embodiments of the invention are set forth in the accompanying drawings and the description below. Other features of the invention will be apparent from the description and drawings, and from the claims.

DETAILED DESCRIPTION OF THE INVENTION

Figure 1:
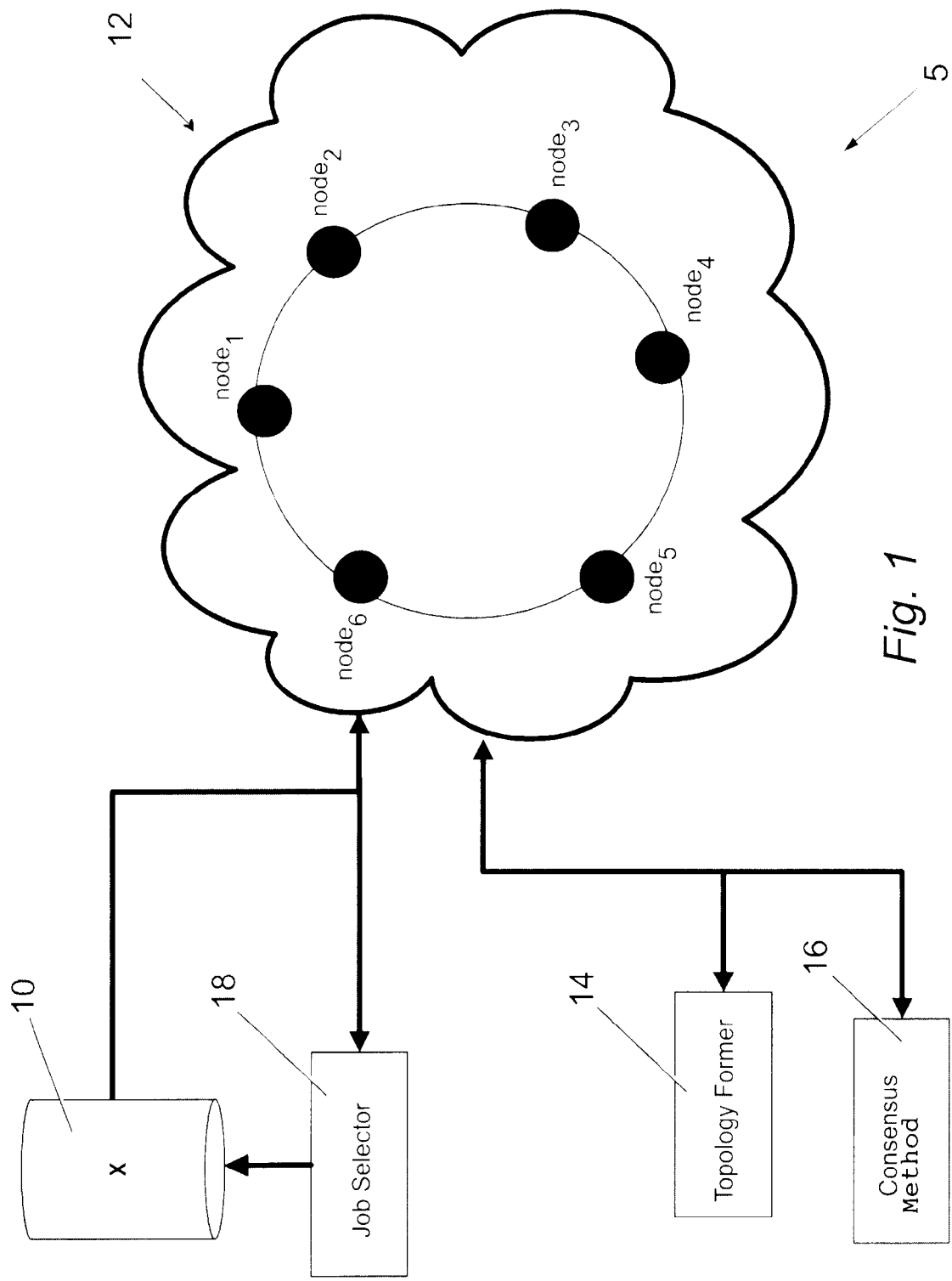
FIG. 1 is a block diagram of a software architecture of a workload scheduling system in accordance with one embodiment of the invention.

Exemplary methods, systems, and computer program products for workload scheduling are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

One or more embodiments provide a workload scheduling system based on a consensus method, for job distribution in a heterogeneous distributed computing environment. This method may be employed to avoid the need for a central (master) server of a traditional master/agent architecture. This, in turn, may increase the scalability and fault-tolerance of the network and more evenly distributes traffic therein.

Fault-tolerant systems often require mechanisms for enabling independent computers or processes to arrive at a mutual agreement of some kind (or common view of the state of the system). It may be necessary, for example, for the computers of a redundant system to periodically synchronise their internal clocks. In the absence of faults, it is comparatively easy to reach a satisfactory mutual agreement. In most cases, it suffices simply to exchange values and compute some kind of average. However, when one or more of the computers is faulty, the above exchange process becomes unreliable. In particular, a faulty computer might report one value to a first computer and another value to other computers, causing each to calculate a different "average". The problem of achieving a common view in a fault-tolerant system is a major challenge of distributed computing; and is known by a number of names, including the problem of the Byzantine generals, the Byzantine agreement or the consensus problem.

Consider a network of n computers that can communicate by exchanging messages along bidirectional links. Consensus attempts to ensure that when a source computer disseminates a message, all the recipient computers receive that message unchanged. Furthermore, the message received by a recipient computer must be identical to the message issued by the source computer. However, a computer that receives a message does not know a priori whether or not a source computer is reliable. To overcome this problem, a protocol is required that enables the recipient computers to agree amongst themselves on the identity of the value/message received. For this, the recipient computers must exchange the values they have received. However, as the computers cannot be assumed to be completely reliable, messages/values may be exchanged that are different from those received; and several rounds of exchanges required to overcome these faults.

Referring to FIG. 1, one embodiment 5 comprises a repository 10 of jobs ($job^{T \in \mathbb{R}^{1 \times m}}$) to be performed in a distributed heterogeneous network 12. Each job ($job_i$) may be accompanied by a requirement vector $\underline{req}_i^{\in \mathbb{R}^{1 \times m}}$) indicating the resources (e.g. CPU usage, memory, network traffic etc.) required by the job. Thus, the job repository 10 effectively contains a matrix $X^{\in \mathbb{R}^{max(r-1)}}$ of job, requirement vector pairs $x_i=(job_i, req_i)$.

For simplicity, assume that the distributed network 12 comprises n nodes ($\underline{node}^{T \in \mathbb{R}^{1 \times n}}$) wherein each node ($node_i$) possesses resources $\underline{res}_i^{\in \mathbb{R}^{1 \times r}}$. The embodiment employs a topology-forming method 14 together with a modified average consensus method 16 to enable nodes in the distributed network 12 to advise other nodes in the network of their current status and availability to execute new jobs. The embodiment further comprises a job-selection module 18, which enables the nodes ($\underline{node}^{T \in \mathbb{R}^{1 \times n}}$) in the distributed network 12 to select an optimal job ($job_k$) (to execute next) from the job repository 10, in accordance with a user-defined desired usage of the resources $\underline{res}_i^{\in \mathbb{R}^{1 \times r}}$) of each node ($node_i$) and the resource requirements $\underline{req}_k^{\in \mathbb{R}^{1 \times r}}$) of the job ($job_k$).

Topology Forming Method (14)

The topology forming method 14 establishes a virtual network comprising a logical topology of the nodes ($\underline{node}^{T \in \mathbb{R}^{1 \times n}}$) in the distributed heterogeneous network 12. Within, the virtual network, the logical topology establishes which nodes can communicate with each other. The logical topology may be defined so that each node is directly connected to (and can communicate with) j neighbouring nodes (wherein j<n−1). Thus, $node_i$ is provided with a neighbourhood $N_i$, comprising j nodes ($node_p$, p=1 to j). The number of nodes to which a node is connected may be defined by the user, wherein the fault-tolerance (and convergence rate) of the embodiment is improved by increasing the number of such nodes. The only condition imposed on the topology is that the graph formed by the virtual network must be connected, in other words, starting from each node it must be possible to reach any other node through an arbitrary number of steps.

Thus, in a ring topology each node may have only two connections and two neighbours. So, for example, referring to FIG. 1, $node_1$ is directly connected to $node_2$ and $node_6$. Similarly, $node_2$ is directly connected to $node_1$ and $node_3$; and $node_6$ is directly connected to $node_1$ and $node_5$. The topology shown in FIG. 1 is provided for exemplary purposes only and should in no way be construed as limiting the one or more embodiments to a ring topology. In particular, the skilled person will understand that the one or more embodiments of the invention are operable with any topology and number of nodes in the distributed network 12 (subject to the above-mentioned connected constraint).

Node (Used Resources) State Variable

Each node ($node_i$) in the virtual network comprises a used resources state variable indicating the extent to which the nodes resources are occupied by the jobs currently running thereon. This information may be acquired from real-time resource consumption metrics gathered by monitoring software. In particular, defining the $o_i$ as the consumption metric vector associated with a given resource vector $res_i$, the extent to which a given node's resources are occupied (by currently running jobs) can be given by a scalar variable $state_i$, which is a weighted sum of the consumption metrics of the resource variables of a node ($node_i$), i.e.

$$state_i = \sum o_{i,j} \cdot res_{i,j}$$

or, in vector notation, $state = O^T diag(\Theta)$, wherein state $\in \mathbb{R}^{n \times 1}$, $O \in \mathbb{R}^{n \times r}$ and $\Theta \in \mathbb{R}^{n \times r}$. The modified average consensus method 16 employed in one embodiment of the invention enables the nodes to propagate this information throughout the entire virtual network even to nodes to which the originating node is not directly connected.

A similar notation may be used to describe the requirements of a particular job (in the job repository). In particular, the net requirements ($e_q$) of a job ($job_q$) may be defined as $$e_q = \text{\textbullet}\, q_{\text{...}}$$

Modified Average Consensus Method (16)
Conventional Average Consensus Model

The average consensus model of a graph provides a distributed method of calculating graph evolution with an input $u_i$ to a node$_i$ and its neighbours ($N_i$). Thus, if the evolution of the state$_i$ of node$_i$ can be denoted by state$_i$=$f_i$(state$_i$)+$u_i$(state$_i$, state$_p$), p=1 to j, $\text{\textbullet}_{p\in N_i}$ ℸ state$_i$=$u_i$(state$_i$,state$_p$), it can be demonstrated that $$state_i = \sum_{p=1}^{\bullet} \text{\textbullet}_{p\in N_i}(state_i - state_p)$$

(continuous solution) or state$_i$ $$(k+1) = \frac{1}{N_i + 1}(state_i(k) + \sum_{p \in N_i}\text{\textbullet}\, state_p(k))$$

(discrete solution) asymptotically solves the consensus problem into a connected graph. Accordingly, the dynamic system converges to the mean of the initial states, $$\lim_{k \to \infty} state_i = \frac{1}{j}\sum \text{\textbullet}\, state_p(0)$$

(continuous solution) or $$\lim_{k \to \infty} state_i = \frac{1}{j}\sum \text{\textbullet}\, state_p(0)$$

(discrete solution), wherein the proof for these limits is derived from the related Nyquist diagram therefor.

Modified Average Consensus Method (16)

One embodiment of the invention modifies the above-mentioned traditional average consensus method by introducing a virtual node V (not shown), which may be directly connected to all of the other nodes within the virtual network. Thus, the virtual node V is included within the neighbourhood $N_i$ of a node$_i$. Using this approach, each node (node$_i$) calculates its next state (state$_i$(k+1)) from:
  its current state (state$_i$(k)); and
  the current states of the other nodes (including the virtual node V) in its neighbourhood $N_i$ using the following formula state $$(k+1) = \frac{1}{N_i + 1}(state_i(k) + \sum_{p \in N_i}\text{\textbullet}\, state_p(k)).$$

The virtual node V has a user-configurable, fixed state which represents the desired workload of all the nodes in the virtual network. The inclusion of the virtual node V into the neighbourhood of each node in the virtual network causes the average consensus method with all the other nodes in the virtual network to balance against and converge to the fixed state of the virtual node V (wherein the convergence speed is related to the Laplacian of the network graph). Thus, by making the state of the virtual node V configurable by the user, one embodiment of the invention may provide a mechanism for tuning a workload schedule to meet a desired usage of the resources of the nodes (i.e. operating point) in the virtual network (i.e. to alter the operating point of the virtual network).

Job-Selection Module (18)

The job-selection module 18 may enable a node (node$_i$) to select a job (from the job repository 10) to execute next, in accordance with the node's current state and its calculated next state. In particular, if state$_i$(k−1)<state$_i$(k), then no new job is to be undertaken by the node at the next iteration. However, if state$_i$(k+1) Ostate$_i$(k), a difference variable is defined as $\gamma_i =$ state$_i$(k+1)−state$_i$(k) (i.e. difference between the calculated next state of node$_i$ and the current state of the node). The next job (job$_{k+1}$) selected (from the job repositary) is the job (job$_r$) whose net requirements variable ($e_r$) has minimal difference from the difference variable (i.e. $e_r|\min_r (e_r)$).

Figure 2:
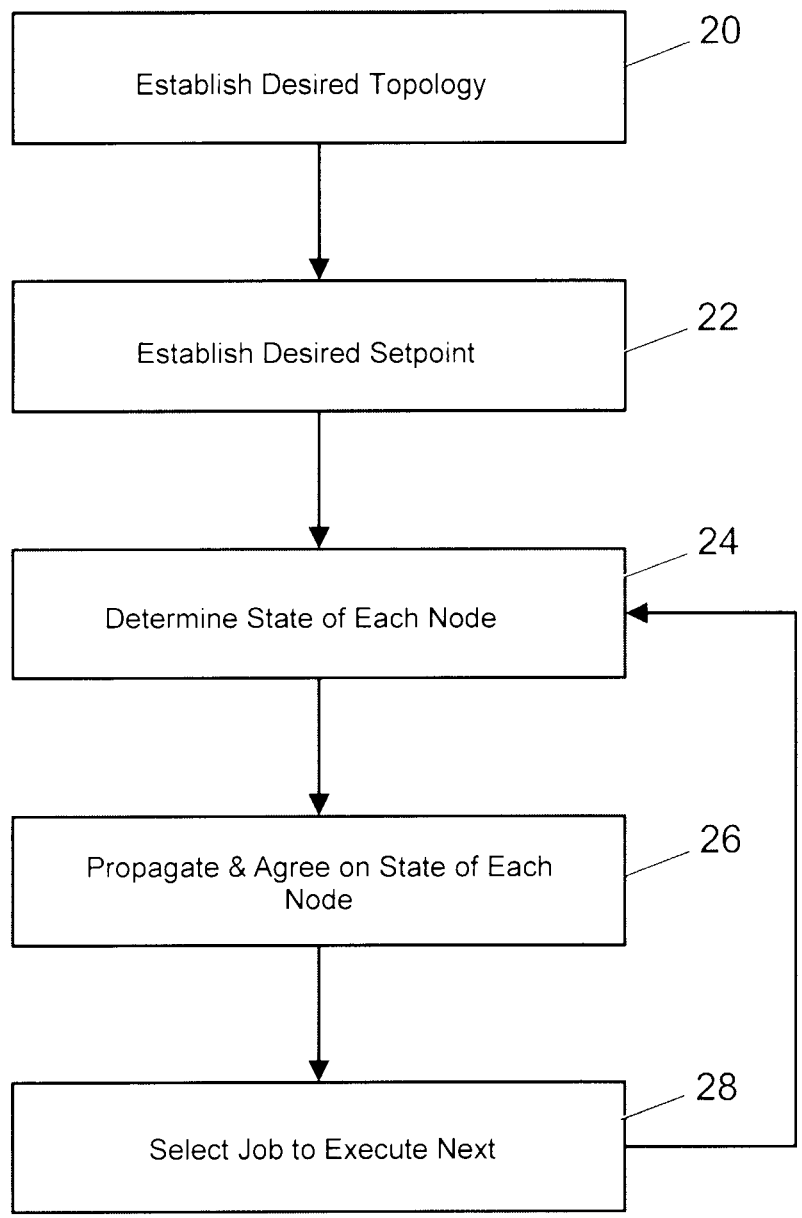
FIG. 2 is a flow chart of a method of workload scheduling in accordance with one embodiment of the invention.

Referring to FIG. 2, in another embodiment of the invention, the computer-implemented method comprises establishing 20 the virtual network in accordance with a desired topology, subject to a connected graph constraint; establishing 22 the desired operating point of the heterogeneous distributed computing environment (i.e. the extent to which the resources of its nodes are to be occupied by jobs to be executed); determining 24 the current state of each node in the virtual network from the extent to which the resources of the nodes are occupied by the jobs currently running thereon; calculating 26 the next state of each node in the network, from their current states together with the current states of the nodes in their neighborhoods and the desired operating point; selecting 28 a job from the job repository to be executed by a given node, in accordance with the extent to which the current state of the node differs from the calculated next state of the node.

Figure 3:
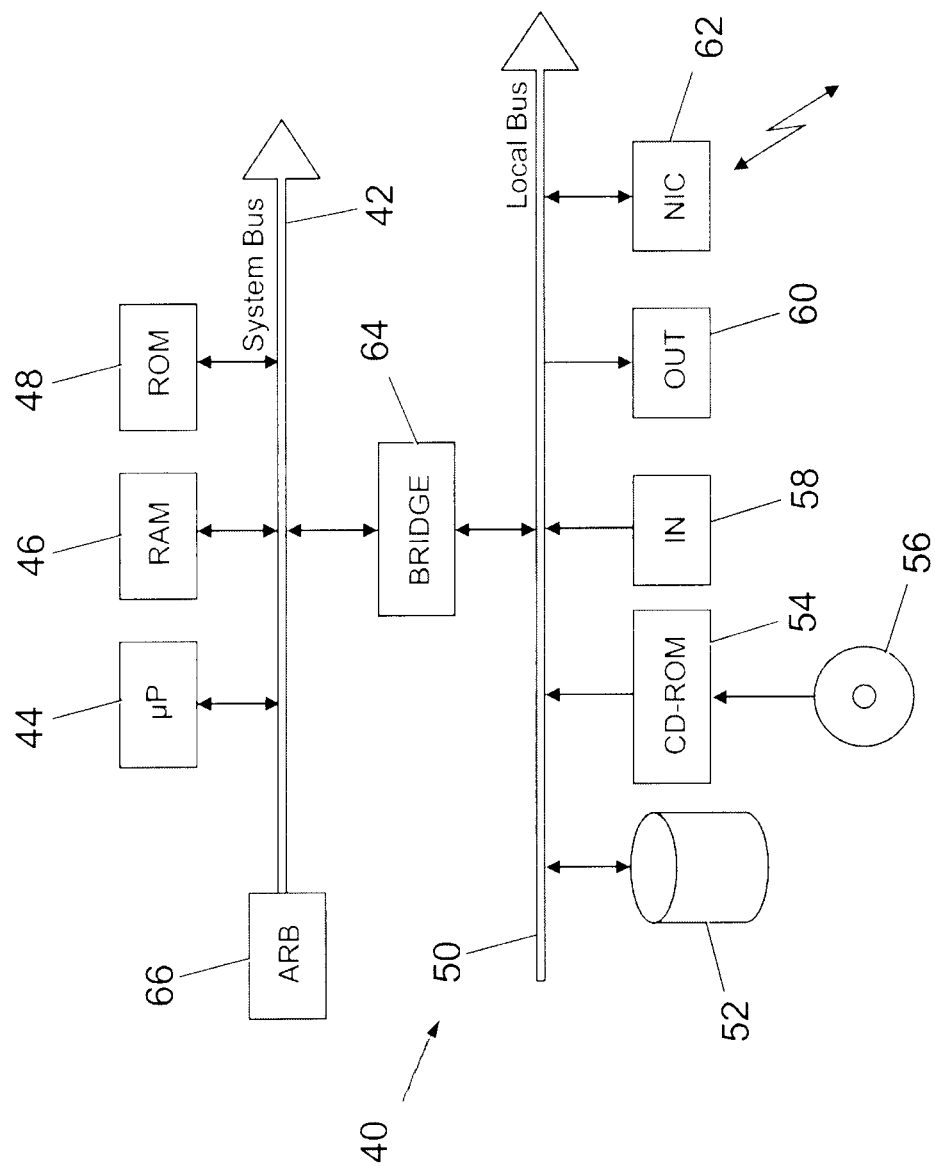
FIG. 3 is a block diagram of a computer system adapted to support the method of workload scheduling in accordance with one embodiment of the invention.

Referring to FIG. 3, in another embodiment, a computer system 40 adapted to support the one or more embodiments is formed by several units that are connected in parallel to a system bus 42. In detail, one or more microprocessors (XP) 44 control operation of the computer 40; a RAM 46 is directly used as a working memory by the microprocessors 44, and a ROM 48 stores basic code for a bootstrap of the computer 40. Peripheral units are clustered around a local bus 50 (by means of respective interfaces). Particularly, a mass memory consists of a hard-disk 52 and a drive 54 for reading CD-ROMs 56. Moreover, the computer 40 includes input devices 58 (for example, a keyboard and a mouse), and output devices 60 (for example, a monitor and a printer). A Network Interface Card (NIC) 62 is used to connect the computer 40 to the network. A bridge unit 64 interfaces the system bus 42 with the local bus 50. Each microprocessor 44 and the bridge unit 64 can operate as master agents requesting an access to the system bus 42 for transmitting information. An arbiter 66 manages the granting of the access with mutual exclusion to the system bus 42.

Similar considerations apply if the system has a different topology, or it is based on other networks. Alternatively, the computers have a different structure, including equivalent units, or consist of other data processing entities (such as PDAs, mobile phones and the like).

Embodiments of the invention may take the form of an entirely hardware embodiment, an entirely software embodiment or an embodiment containing both hardware and software elements. In one embodiment, the invention is implemented as a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should also be understood that the inventive concepts disclosed herein are capable of many modifications. To the extent such modifications fall within the scope of the appended claims and their equivalents, they are intended to be covered by this patent.

The invention claimed is:

1. A method of scheduling a workload for a plurality of computers executing one or more jobs, the method comprising:
    establishing a virtual network topology comprising one or more nodes linked to form a connected graph;
    establishing a virtual node, the virtual node directly connected to all the other nodes of the network, the virtual node comprising a user-configurable fixed state value which represents a desired workload of all the nodes in the network;
    determining, based on the execution of one or more jobs, a current usage of resources of at least some of the computers in the network, the nodes corresponding to the at least some of the computers in the network, the current usage of the resources representing a current state value of the nodes;
    calculating a predicted state value for each node in the network, the predicted state value of the node based on:
        i) the current state value of the node; and
        ii) the current state value of the nodes in its neighbourhood group of nodes,
    wherein the predicted state value of all the other nodes in the network converge to the fixed state value of the virtual node; and
    selecting another job having a predefined resource usage requirement to be executed next on one of the nodes in the event the resource requirement of the selected job is closest to the difference between the predicted state value of the node and the current state value of the node.

2. The method of claim 1, wherein the determining the current usage of the resources of at least some of the computers in the network further comprises acquiring information related to the current usage of the resources from resource consumption data.

3. The method of claim 1, wherein the establishing a network is preceded by allowing a user to select a topology for the network.

4. The method of claim 3, wherein the establishing the network comprises linking the computers in accordance with the selected topology.

5. The method of claim 1, wherein the calculating a predicted state value further comprises:
    allowing a user to select a neighbourhood value; and
    for each of the nodes in the graph, forming the neighbourhood group of nodes, the neighbourhood group comprising the neighbourhood value number of nodes directly connected to each of the nodes in the graph, each neighborhood group of nodes comprising the virtual node.

6. A computer program product for scheduling a workload for a plurality of computers executing one or more jobs, the computer program product comprising:
    a non-transitory computer-usable storage medium including:
        computer program instructions for establishing a virtual network topology comprising one or more nodes linked to form a connected graph;
        computer program instructions for establishing a virtual node, the virtual node directly connected to all the other nodes of the network, the virtual node comprising a user-configurable fixed state value which represents a desired workload for the computers in the network;
        computer program instructions for determining, based on the execution of one or more jobs, a current usage of resources of at least some of the computers in the network, the nodes corresponding to the at least some of the computers in the network, the current usage of the resources representing a current state value of the nodes;
        computer program instructions for calculating a predicted state value for each node in the network, the predicted state value of the node based on:
            i) the current state value of the node; and
            iii) the current state value of each of the other nodes in its neighbourhood group,
        wherein the predicted state value of all the other nodes in the network converges to the fixed state value of the virtual node; and
        computer program instructions for selecting another job having a predefined resource usage requirement to be executed next on one of the nodes in the network in the event the resource requirement of the selected job is closest to the difference between the predicted state value of the node and the current state value of the node.

7. The computer program product of claim 6, wherein the computer program instructions for determining the current usage of the resources of at least some of the computers in the network further comprises computer program instructions for acquiring information related to the current usage of the resources from resource consumption data.

8. The computer program product of claim 7, further comprising computer program instructions for collecting the resource consumption data.

9. The computer program product of claim 6, wherein the computer program instructions for establishing the network is preceded by computer program instructions for allowing a user to select a topology for the network.

10. The computer program product of claim 9, wherein the computer program instructions for establishing the network comprises computer program instructions for linking the computers in accordance with the selected topology.

11. The computer program product of claim 6, wherein the computer program instructions for calculating a predicted state value further comprises:

computer program instructions for allowing a user to select a neighborhood value; and computer program instructions for, for each of the nodes in the graph, forming the neighbourhood group of nodes, the neighbourhood group comprising the neighbourhood value number of nodes directly connected to each of the nodes in the graph, each neighbourhood group of nodes comprising the virtual node.

12. A system for workload scheduling for a plurality of computers executing one or more jobs, comprising:

one or more processors;

a memory accessible by the processors;

a nonvolatile storage device where backups are stored; and a process stored in the memory and executed by at least one of the processors, the process comprising:

establishing a virtual network topology comprising one or more nodes linked to form a connected graph;

establishing a virtual node, the virtual node directly connected to all the other nodes of the network, the virtual node comprising a user-configurable fixed state value which represents a desired workload of all the nodes in the network;

determining, based on the execution of one or more jobs, a current usage of resources of at least some of the computers in the network, the nodes corresponding to the at least some of the computers in the network, the current usage of the resources representing a current state value of the nodes;

calculating a predicted state value for each node in the network, the predicted state value of the node based on:

i) the current state value of the node; and ii) the current state value of the nodes in its neighbourhood group of nodes, wherein the predicted state value of all the other nodes in the network converge to the fixed state value of the virtual node; and selecting another job having a predefined resource usage requirement to be executed next on one of the nodes in the event the resource requirement of the selected job is closest to the difference between the predicted state value of the node and the current state value of the node.

13. The system of claim 12, wherein the process of determining the current usage of the resources of at least some of the computers in the network further comprises acquiring information related to the current usage of the resources from resource consumption data.

14. The system of claim 12, wherein the process of establishing the network is preceded by allowing a user to select a topology for the network, the computers linked in accordance with the selected topology.

15. The system of claim 12, wherein the process of calculating the predicted state value further comprises:

allowing a user to select a neighborhood value;

for each of the nodes in the graph, forming the neighbourhood group of nodes, the neighbourhood group comprising the neighbourhood value number of nodes directly connected to each of the nodes in the graph, each neighbourhood group of nodes comprising the virtual node.

16. The method of claim 1, wherein the workload scheduling is based on a modified average consensus method.

17. The method of claim 1, wherein the workload scheduling is performed without a central server.

* * * * *